(12) United States Patent
Fan et al.

(10) Patent No.: US 8,986,485 B2
(45) Date of Patent: Mar. 24, 2015

(54) TOUCH PANEL AND FABRICATION METHOD THEREOF

(75) Inventors: Sheng-Chin Fan, Hsinchu County (TW); Tun-Chun Yang, Taipei (TW); Seok-Lyul Lee, Hsinchu (TW); Wei-Ming Huang, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 887 days.

(21) Appl. No.: 13/084,542

(22) Filed: Apr. 11, 2011

(65) Prior Publication Data

US 2012/0169625 A1 Jul. 5, 2012

(30) Foreign Application Priority Data

Dec. 29, 2010 (TW) .............................. 99146623 A

(51) Int. Cl.
*G06F 3/044* (2006.01)
*G06F 3/045* (2006.01)

(52) U.S. Cl.
CPC ................ *G06F 3/044* (2013.01); *G06F 3/045* (2013.01); *G06F 2203/04103* (2013.01)
USPC ........... 156/256; 156/153; 156/300; 156/264; 156/265

(58) Field of Classification Search
USPC ......... 156/267, 269, 270, 256, 263, 278, 291, 156/300, 153, 264, 265
See application file for complete search history.

(56) References Cited

U.S. PATENT DOCUMENTS

| 2009/0324939 A1 | 12/2009 | Feinstein et al. |
| 2010/0141135 A1 | 6/2010 | Kase et al. |
| 2012/0050201 A1* | 3/2012 | Nozawa ........................ 345/173 |
| 2014/0078108 A1* | 3/2014 | Hotelling et al. ............. 345/174 |

FOREIGN PATENT DOCUMENTS

| CN | 1345010 | 4/2002 |
| CN | 1549104 | 11/2004 |
| CN | 101140368 | 3/2008 |
| JP | 2009-263159 | 11/2009 |
| TW | 200917282 | 4/2009 |
| TW | 200947282 | 11/2009 |

OTHER PUBLICATIONS

"First Office Action of China counterpart application" issued on Jul. 4, 2012, p1-p7, in which the listed references were cited.
"Office Action of Taiwan Counterpart Application", issued on Jun. 10, 2013, p1-p5, in which the listed references were cited.

* cited by examiner

*Primary Examiner* — Linda L Gray
(74) *Attorney, Agent, or Firm* — Jianq Chyun IP Office

(57) ABSTRACT

A fabrication method of a touch panel is provided. In the fabrication method, the two substrates are provided, and a plurality of touch units are formed on each of the substrates. A sealant and a plurality of first spacers are provided between the substrates, and the substrates are bonded through the sealant, so that the touch units are sealed between the substrates. The touch units and the first spacers are surrounded by the sealant. The substrates are thinned. The thinned substrates are cut into a plurality of sub-mounts separated from one another. Each of the sub-mounts has one of the touch units thereon.

9 Claims, 8 Drawing Sheets

TOUCH PANEL AND FABRICATION METHOD THEREOF

CROSS-REFERENCE TO RELATED APPLICATION

This application claims the priority benefit of Taiwan application serial no. 99146623, filed on Dec. 29, 2010. The entirety of the above-mentioned patent application is hereby incorporated by reference herein and made a part of this specification.

BACKGROUND OF THE INVENTION

1. Field of the Invention

The invention relates generally to a panel and a fabrication method thereof, and particularly to a touch panel and a fabrication method thereof.

2. Description of Related Art

Based on different sensing principles, a touch panel can be generally categorized into a resistant touch panel, a capacitive touch panel, an optical touch panel, an acoustic-wave touch panel, and an electromagnetic touch panel. The well-known resistant and capacitive touch panels have been extensively applied to display screens of portable electronic products. However, to comply with the market requirements, the touch panel is developed to have light weight and small thickness.

In general, the weight and the thickness of the touch panel can be reduced by thinning the substrate. The stress of the thinned substrates, however, cannot be well alleviated, and the thinned substrates are thus distorted or bent, which leads to deterioration of the reliability of the substrate. As such, during the fabrication or transportation of the touch panel, the touch panel may be damaged by external force, such that the manufacturing yield rate is affected. In addition, since the substrate is thinned, the existing production equipment need be replaced or modified, which significantly increases the manufacturing costs of the touch panel. Based on the above, how to thin the substrate is one of the issues to be resolved immediately in the field of manufacturing the touch panel.

SUMMARY OF THE INVENTION

The invention is directed to a fabrication method of a touch panel. By applying the fabrication method, the touch panel having thinned substrates and favorable reliability can be formed.

The invention is further directed to a touch panel that has thinned substrates and favorable reliability.

In an embodiment of the invention, a fabrication method of a touch panel is provided. In the fabrication method, two substrates are provided, and a plurality of touch units are formed on each of the substrates. A sealant and a plurality of first spacers are provided between the substrates, and the substrates are bonded through the sealant, so that the touch units are sealed between the substrates. The touch units and the first spacers are surrounded by the sealant. The substrates are thinned. The thinned substrates are cut into a plurality of sub-mounts separated from one another. Each of the sub-mounts has one of the touch units thereon.

According to an embodiment of the invention, each of the touch units is a capacitive touch circuit layer.

According to an embodiment of the invention, a method of forming the first spacers includes randomly distributing the first spacers between the substrates.

According to an embodiment of the invention, a method of forming the first spacers includes printing the first spacers onto one of the substrates by screen-printing.

According to an embodiment of the invention, a method of forming the first spacers includes forming the first spacers on one of the substrates by photolithography.

According to an embodiment of the invention, the fabrication method further includes removing the first spacers after the sub-mounts separated from one another are formed.

According to an embodiment of the invention, each of the touch units is a resistant touch circuit layer.

According to an embodiment of the invention, a method of forming each of the resistant touch circuit layers includes forming a plurality of first patterned circuit layers on each of the substrates, forming a plurality of second spacers on each of the first patterned circuit layers, providing a plurality of carriers on each of which a second patterned circuit layer is formed, and bonding each of the carriers to one of the substrates to cover one of the first patterned circuit layers. Here, the second spacers are sandwiched between the first patterned circuit layers and the second patterned circuit layers.

According to an embodiment of the invention, the fabrication method further includes removing the first spacers after the sub-mounts separated from one another are formed.

According to an embodiment of the invention, a method of forming each of the resistant touch circuit layers includes forming a plurality of first patterned circuit layers on each of the substrates and forming the first spacers on each of the first patterned circuit layers.

According to an embodiment of the invention, the fabrication method further includes following steps. After the sub-mounts separated from one another are formed, a plurality of carriers on each of which a second patterned circuit layer is formed are provided. Each of the carriers is bonded to one of the sub-mounts to cover one of the first patterned circuit layers, and the first spacers are sandwiched between the first patterned circuit layers and the second patterned circuit layers.

According to an embodiment of the invention, the fabrication method further includes forming at least one coating on the substrates after thinning the substrates and before forming the sub-mounts separated from one another.

According to an embodiment of the invention, the coating includes an electromagnetic-wave shielding layer, a passivation layer, or a layer in which the electromagnetic-wave shielding layer and the passivation layer are stacked.

In an embodiment of the invention, a touch panel formed by conducting the aforesaid fabrication method of the touch panel is provided.

Based on the above, in the fabrication method of the touch panel of the invention, two substrates on which the touch units are formed are bonded, thinned, cut, and separated, so as to form the touch panels characterized by compactness and favorable reliability.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF EMBODIMENTS

First Embodiment

Figure 1:
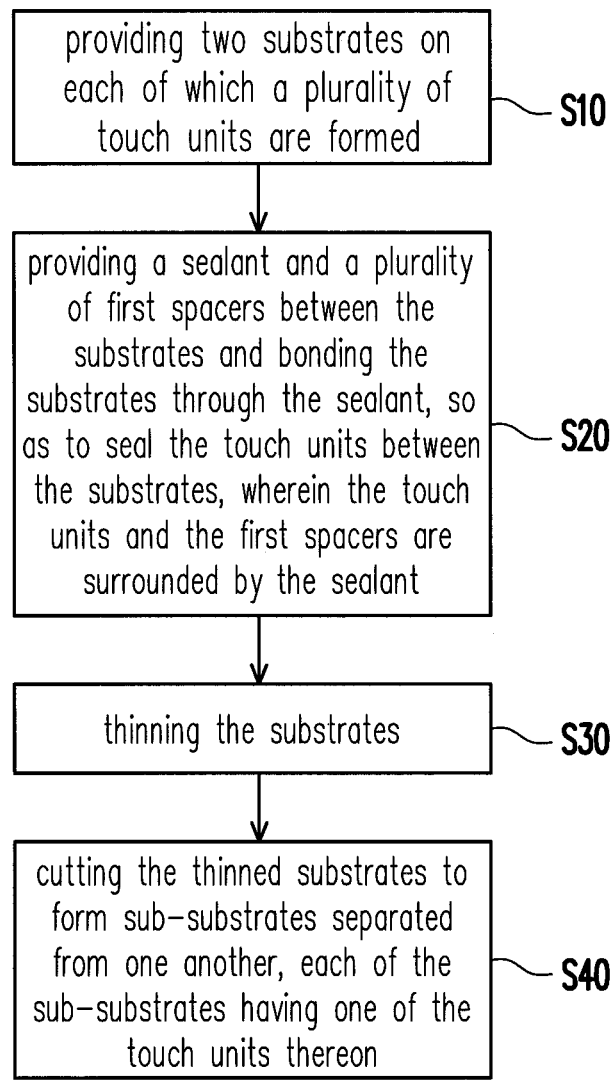
FIG. 1 is a flow chart illustrating a fabrication method of a touch panel according to an embodiment of the invention.
Figure 2A:
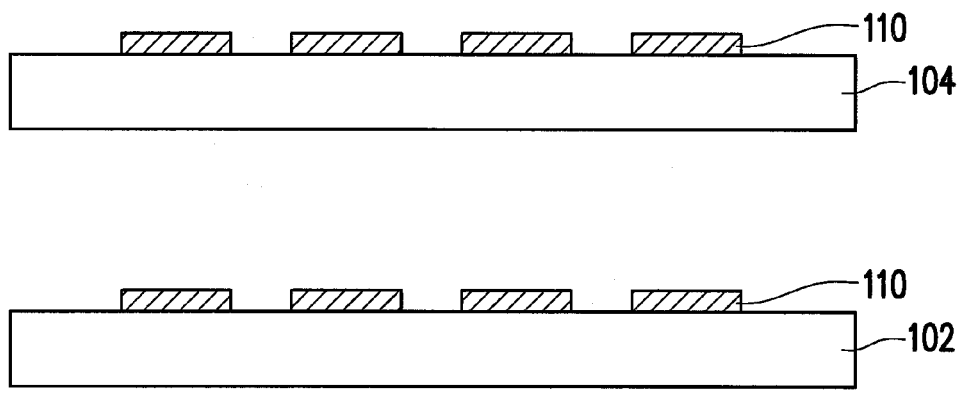
FIG. 2A to FIG. 2E are schematic views illustrating a fabrication method of a touch panel according to a first embodiment of the invention.

FIG. 1 is a flow chart illustrating a fabrication method of a touch panel according to an embodiment of the invention. FIG. 2A to FIG. 2E are schematic views illustrating a fabrication method of a touch panel according to a first embodiment of the invention. With reference to FIG. 1 and FIG. 2A, in step S10, two substrates 102 and 104 are provided, and a plurality of touch units 110 are already formed on each of the substrates 102 and 104. In this embodiment, the substrates 102 and 104 are, for instance, glass substrates, quartz substrates, or other appropriate substrates. Each of the touch units 110 is a capacitive touch circuit layer, for instance. Specifically, in this embodiment, each of the touch units 110 includes a plurality of first sensing series (not shown) extending along a first direction and a plurality of second sensing series (not shown) extending along a second direction, for instance. Each of the first sensing series has a plurality of first electrodes serially connected to one another, and each of the second sensing series has a plurality of second electrodes serially connected to one another. In this embodiment, each film in the touch units 110 is formed on the substrates 102 and 104 by deposition, for instance, and the touch units 110 on the substrate 102 correspond to the touch units 110 on the substrate 104, for instance. Note that the touch units 110 described in this embodiment have complete touch functions, and therefore the touch units 110, without being further processed, can directly perform the touch functions. Moreover, in this embodiment, each of the touch units 110 is a capacitive touch circuit layer, for instance, while other types of touch units can also serve as the touch units 110 in other embodiments.

Figure 2B:
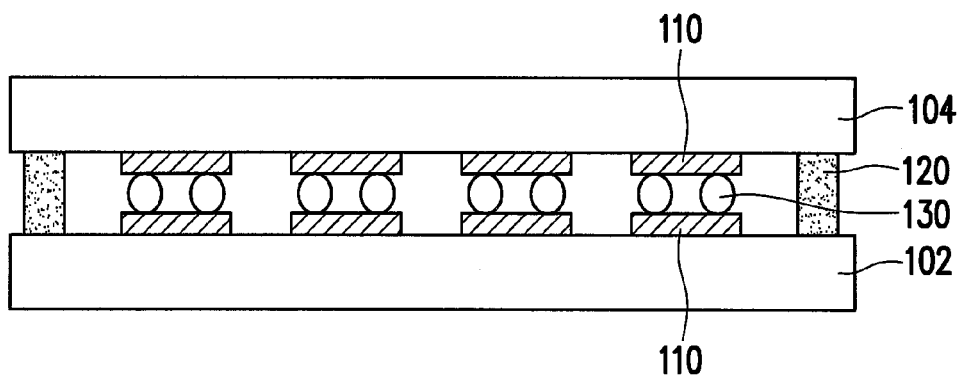

With reference to FIG. 1 and FIG. 2B, in step S20, a sealant 120 and a plurality of first spacers 130 are provided between the substrates 102 and 104, and the substrates 102 and 104 are bonded together through the sealant 120, such that the touch units 110 are sealed between the substrates 102 and 104. Here, the touch units 110 and the first spacers 130 are surrounded by the sealant 120. In this embodiment, as shown in FIG. 2B, the sealant 120 is formed on one of the substrates 102 and 104, such that the sealant 120 surrounds the touch units 110 on the substrates 102 and 104. The first spacers 130 are formed in the space surrounded by the sealant 120. Here, the first spacers 130 are rod-shaped spacers, ball-shaped spacers, columnar spacers, and so on, for instance. Besides, the method of forming the first spacers 130 includes randomly distributing the first spacers 130 to one of the first substrates 102 and 104. Alternatively, the first spacers 130 are printed on one of the substrates 102 and 104 by screen-printing, or the first spacers 130 are formed on one of the substrates 102 and 104 by photolithography. Here, the sealant 120 and the first spacers 130 can be formed on the same substrate 102, on the same substrate 104, or on different substrates 102 and 104. The substrates 102 and 104 are aligned and bonded through the sealant 120. As such, the touch units 110 on the substrate 102 correspond to the touch units 110 on the substrate 104 in a one-on-one manner, for instance.

Figure 2C:
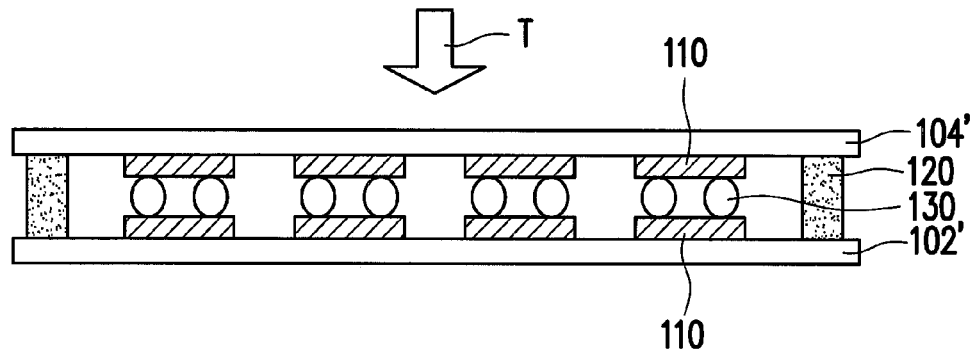
Figure 2D:
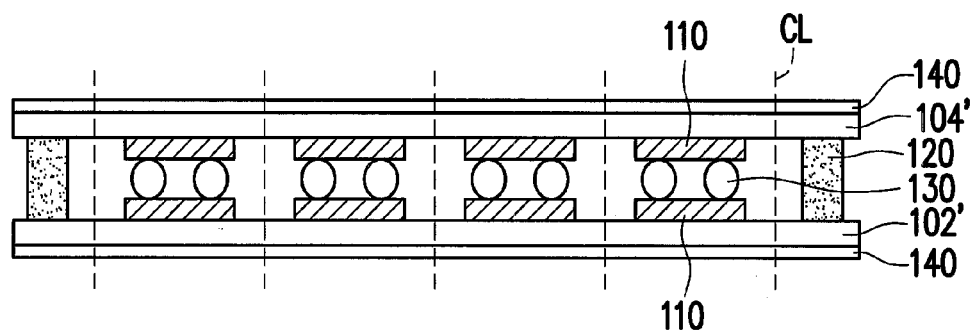

With reference to FIG. 1 and FIG. 2C, in step S30, a thinning process T is performed on the substrates 102 and 104, so as to form the thinned substrates 102' and 104'. In this embodiment, the thinning process T is well-known to people having ordinary skill in the art exemplarily pertinent to mechanical polishing, etch processing, and so on. As indicated in FIG. 2D, after the substrates 102 and 104 are thinned, and before sub-mounts 102a and 104a (shown in FIG. 2E) are formed, at least one coating 140 can be selectively formed on the substrates 102' and 104' in this embodiment. The coating 140 includes an electromagnetic-wave shielding layer, a passivation layer, or a layer in which the electromagnetic-wave shielding layer and the passivation layer are stacked.

Figure 2E:
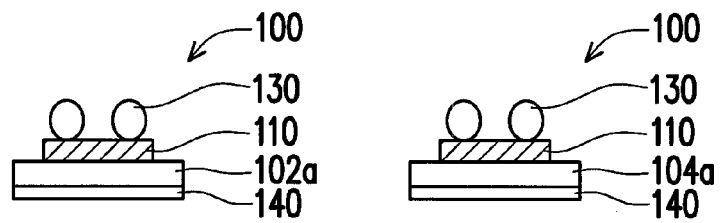

With reference to FIG. 1, FIG. 2D, and FIG. 2E, in step S40, the thinned substrates 102' and 104' are cut to form the sub-mounts 102a and 104a separated from each other. Each of the sub-mounts 102a and 104a has one of the touch units 110 thereon. According to this embodiment, as indicated in FIG. 2D, the separated sub-mounts 102a and 104a depicted in FIG. 2E are formed by cutting the substrate 102' or the substrate 104' along a predetermined cutting line CL with use of a cutter (not shown), for instance. Here, the cutting line CL corresponds to the gap among the touch units 110 and corresponds to the inner edge of the sealant 120, and the cut sub-mounts 102a and 104a are removed from the sealant 120. That is to say, the sealant 120 is formed around the substrates 102' and 104', and therefore there is no sealant 120 between the sub-mounts 102a and 104a. As such, the sub-mounts 102a and 104a are separated from each other after the cutting process is performed.

As indicated in FIG. 2E, in this embodiment, after the thinned substrates 102' and 104' are cut, each of the sub-mounts 102a and 104a and the touch units 110 thereon together form a touch panel 100. Specifically, the touch units 110 in this embodiment have the complete touch functions. Therefore, after the substrates 102' and 104' are cut, the sub-mounts 102a and 104a and the touch units 110 thereon together form the touch panel 100 having complete touch functions. In this embodiment, the touch panel 100 includes the sub-mount 102a or the sub-mount 104a, the touch unit 110, and the first spacers 130. The touch unit 110 is configured on the sub-mount 102a or 104a, and the first spacers 130 are configured on the touch unit 110. Here, the sub-mounts 102a and 104a are thinned, and the touch unit 110 is a capacitive touch circuit layer, for instance. Note that when the touch panel 100 is assembled to a liquid crystal display module or any other element to form a touch display device, the first spacers 130 can, for instance, act as support elements between the touch panel 100 and the liquid crystal display module and are conducive to eliminating waterfall defects occurring on the display frames of the display device.

Figure 3:
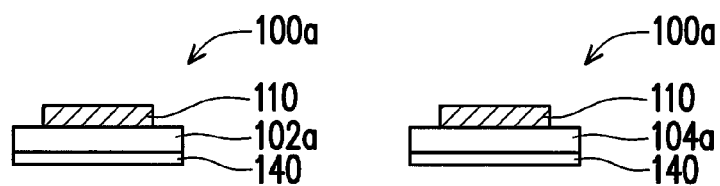
FIG. 3 is a schematic top view illustrating a touch panel according to an embodiment of the invention.

With reference to FIG. 3, in another embodiment of the invention, the fabrication method of the touch panel further includes removing the first spacers 130 after the sub-mounts 102a and 104a that are separated from each other are formed, for instance. The method of removing the first spacers 130 can be determined based on the material of the first spacers 130. Since the method of removing the first spacers 130 is well known to people having ordinary skill in the art, no further description in this regard is provided hereinafter. That is to say, the touch panel 100a formed by conducting the aforesaid method includes the sub-mounts 102a and 104a and the touch units 110 configured on the sub-mounts 102a and 104a but excludes the first spacers 130 that are removed.

In this embodiment, the two substrates are bonded, thinned, cut, and separated when the touch units are already formed on the two substrates, respectively, and then a plurality of touch panels are formed. The touch units are formed on the substrates which are not yet thinned, and therefore the fabrication process of the touch units can be performed when the existing production equipment is applied. It is not necessary to replace or modify the production equipment in order to customize the substrates. As such, the manufacturing costs of the touch panel are not increased. Besides, in the fabrication process of the touch units, the substrates are less likely to be distorted or bent when the substrates are thinned. Moreover, the bonded substrates as a whole have favorable mechanical strength, and the spacers are configured between the two substrates. Hence, when the thinning process is performed on the substrates, the substrates and the touch units thereon can have satisfactory structural stability. In particular, the two thinned substrates can be separated after the last manufacturing step is completely performed or after the substrates are transported to the destination, so as to form the touch panels. As a result, the touch panels having the thinned substrates are rather unlikely to be damaged by stress during transportation. That is to say, the touch panel formed by applying the fabrication method described in this embodiment is compact and reliable and can be customized without significantly increasing the manufacturing costs. What is more, the touch panel having the thinned substrates can have favorable yield rate.

Second Embodiment

Figure 4A:
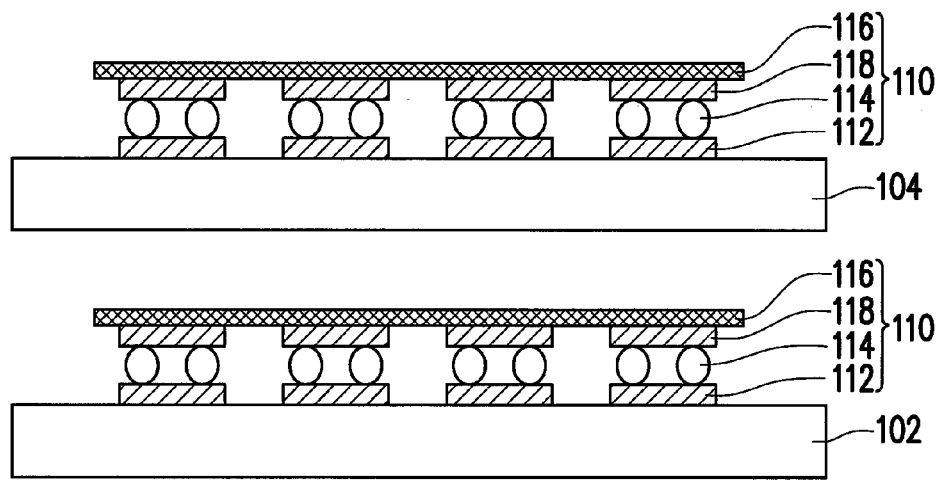
FIG. 4A to FIG. 4E are schematic views illustrating a fabrication method of a touch panel according to a second embodiment of the invention.

FIG. 4A to FIG. 4E are schematic views illustrating a fabrication method of a touch panel according to a second embodiment of the invention. With reference to FIG. 1 and FIG. 4A, in step S10, two substrates 102 and 104 on each of which a plurality of touch units 110 are formed are provided. In this embodiment, each of the touch units 110 is a resistant touch circuit layer, for instance. To be more specific, in this embodiment, each of the touch units 110 is formed by forming a plurality of first patterned circuit layers 112 on each of the substrates 102 and 104 and then forming a plurality of second spacers 114 on each of the first patterned circuit layers 112. A plurality of carriers 116 are provided. The carriers 116 include but are not limited to flexible thin films or plastic substrate materials, and a second patterned circuit layer 118 is already formed on each of the carriers 116. Each of the carriers 116 is bonded to the substrate 102 or the substrate 104 to cover one of the first patterned circuit layers 112. The second spacers 114 are sandwiched between the first patterned circuit layers 112 and the second patterned circuit layers 118. That is to say, in this embodiment, each of the touch units 110 includes the first patterned circuit layer 112 and the second patterned circuit layer 118 and has the complete touch functions. Here, the second spacers 114 serve to maintain the gaps between the first patterned circuit layers 112 and the second patterned circuit layers 118, so as to prevent the first patterned circuit layers 112 and the second patterned circuit layers 118 from being accidentally in contact even though the first and second patterned circuit layers 112 and 118 are not pressed. Note that the touch units 110 having the resistant touch circuit layers are formed by performing the aforesaid steps described in the embodiments, the resistant touch circuit layers can also be formed by applying other methods known to people having ordinary skill in the pertinent art, which should not be construed as a limitation to the invention.

Figure 4B:
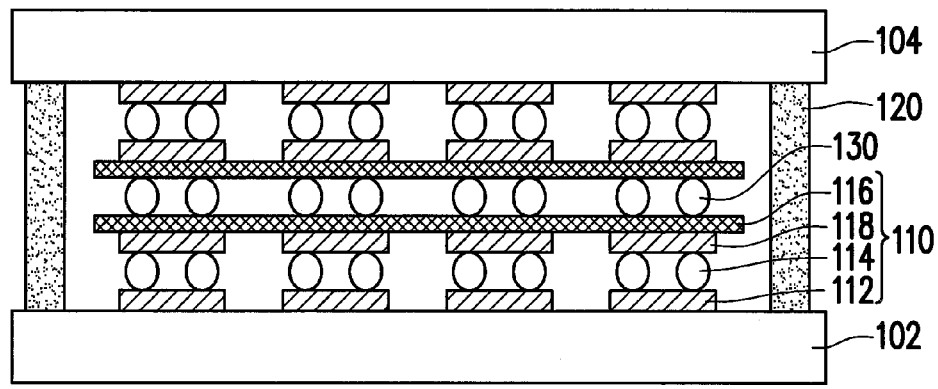

With reference to FIG. 1 and FIG. 4B, in step S20, a sealant 120 and a plurality of first spacers 130 are provided between the substrates 102 and 104, and the substrates 102 and 104 are bonded together through the sealant 120, such that the touch units 110 are sealed between the substrates 102 and 104. Here, the touch units 110 and the first spacers 130 are surrounded by the sealant 120. This step can be referred to as the step described in the first embodiment, while the sealant 120 in this embodiment is merely formed at the peripheries of the substrates 102 and 104 but not formed within the substrates 102 and 104. In addition, the touch units 110 on the substrate 102 correspond to the touch units 110 on the substrate 104 in a one-on-one manner, for instance.

Figure 4C:
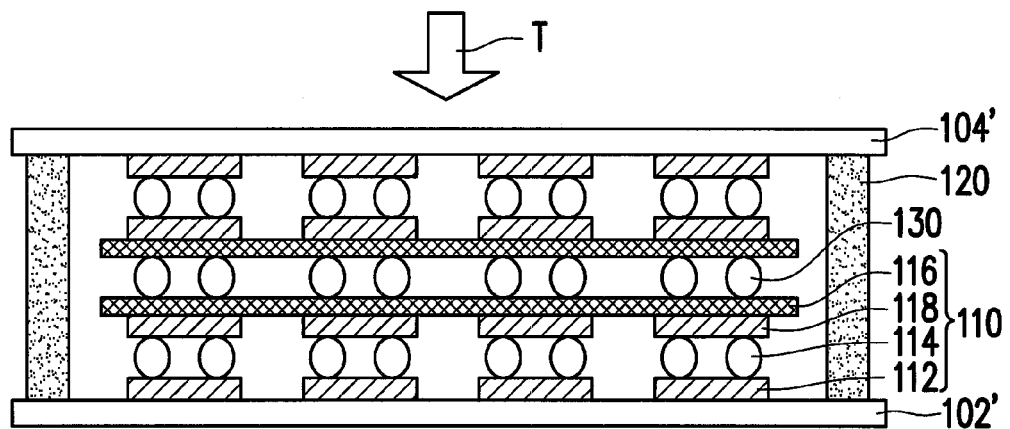
Figure 4D:
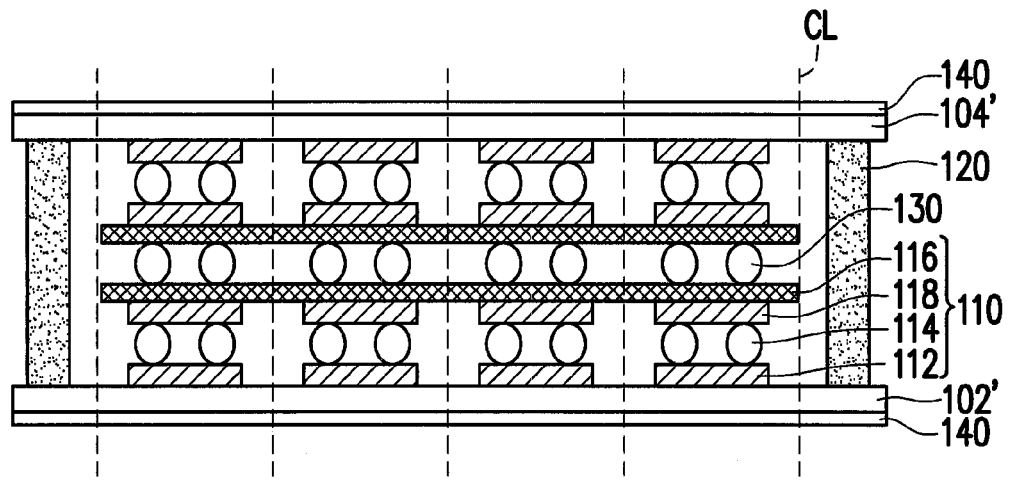

With reference to FIG. 1 and FIG. 4C, in step S30, a thinning process T is performed on the substrates 102 and 104, so as to form the thinned substrates 102' and 104'. In this embodiment, the thinning process T is well-known to people having ordinary skill in the art exemplarily pertinent to mechanical polishing, etch processing, and so on. As indicated in FIG. 4D, after the substrates 102 and 104 are thinned and before sub-mounts 102a and 104a (shown in FIG. 4E) are formed, at least one coating 140 can be selectively formed on the substrates 102' and 104' in this embodiment. According to this embodiment, the coating 140 includes an electromagnetic-wave shielding layer, a passivation layer, or a layer in which the electromagnetic-wave shielding layer and the passivation layer are stacked.

Figure 4E:
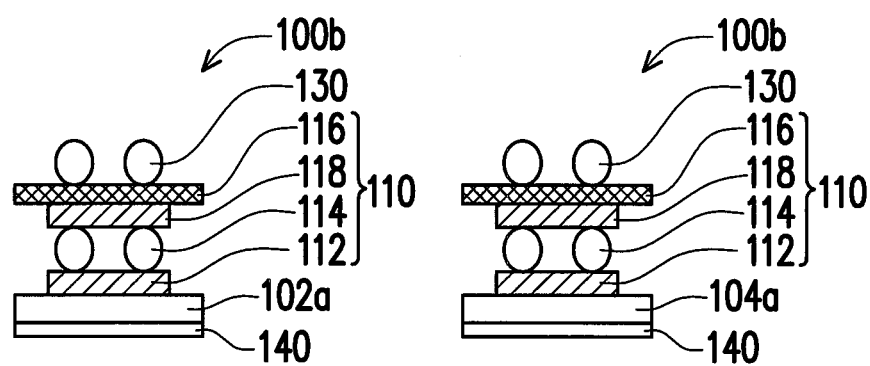

With reference to FIG. 1, FIG. 4D, and FIG. 4E, in step S40, the thinned substrates 102' and 104' are cut to form the sub-mounts 102a and 104a separated from each other. Each of the sub-mounts 102a and 104a has one of the touch units 110 thereon. According to this embodiment, as indicated in FIG. 4D, the separated sub-mounts 102a and 104a depicted in FIG. 4E are formed by performing the cutting process from the top of the substrate 102' or 104' along predetermined cutting lines CL with use of a cutter (not shown). Here, each of the cutting lines CL corresponds to the gap between the touch units 110 and corresponds to the inner edge of the sealant 120, for instance. Thereby, after the cutting process is performed, the sub-mounts 102a and 104a are removed from the sealant 120 and separated from each other.

As indicated in FIG. 4E, in this embodiment, after the thinned substrates 102' and 104' are cut, each of the sub-mounts 102a and 104a and the touch units 110 thereon together forms a touch panel 100b. Specifically, the touch units 110 in this embodiment have the complete touch functions. Therefore, after the substrates 102' and 104' are cut, the sub-mounts 102a and 104a and the touch units 110 thereon together form the touch panels 100b having complete touch functions. In this embodiment, each of the touch panels 100b includes the sub-mount 102a or 104a, the touch unit 110, and the first spacers 130. The touch unit 110 is configured on the sub-mount 102a or 104a, and the first spacers 130 are configured on the touch unit 110. The touch unit 110 in this embodiment includes a first patterned circuit layer 112, a carrier 116, and a plurality of second spacers 114, for instance. The first patterned circuit layer 112 is configured on the sub-mount 102a or the sub-mount 104a. The carrier 116 includes a second patterned circuit layer 118 and covers the first patterned circuit layer 112. The second spacers 114 are sandwiched between the first patterned circuit layer 112 and the second patterned circuit layer 118. Namely, in this embodiment, the second spacers 114 serve to maintain the gap between the first patterned circuit layer 112 and the second patterned circuit layer 118, so as to prevent the first patterned circuit layer 112 and the second patterned circuit layer 118 from being accidentally in contact even though the first and second patterned circuit layers 112 and 118 are not pressed. When the touch panel 100b is assembled to a liquid crystal display module or any other element to form a touch display device, the first spacers 130 can, for instance, act as support elements between the touch panel 100b and the liquid crystal display module and are conducive to eliminating waterfall defects occurring on the display frames of the display device. According to another embodiment of the invention, after the touch panel 110b shown in FIG. 4E is formed, the first spacers 130 can be further removed. As such, the touch panel 100b formed by conducting the aforesaid method includes the sub-mount 102a or 104a and the touch unit 110 configured on the sub-mount 102a or 104a but excludes the first spacers 130 that are removed.

The fabrication method of the touch panel described in this embodiment is similar to that described in the first embodiment. Thus, the touch panels described in these two embodiments have similar advantages, which will not be repeated herein. In this embodiment, the sealant is formed at the peripheries of the substrates but not formed within the substrates. After a thinning process, by performing the cutting process along the cutting line that corresponds to the gap between the touch units and corresponds to the inner edge of the sealant, the cut sub-mounts can be removed from the sealant, so as to form the sub-mounts separated from one another. The touch units on the sub-mounts include the first and second patterned circuit layers. Therefore, after the cutting process is performed on the substrates, the sub-mounts and the touch units thereon, without being further processed, can together form the touch panels with the complete touch functions. The touch panel formed by applying the fabrication method described in this embodiment is compact and reliable and can be customized without significantly increasing the manufacturing costs. What is more, the touch panel having the thinned substrates can have favorable yield rate and production rate.

Third Embodiment

Figure 5A:
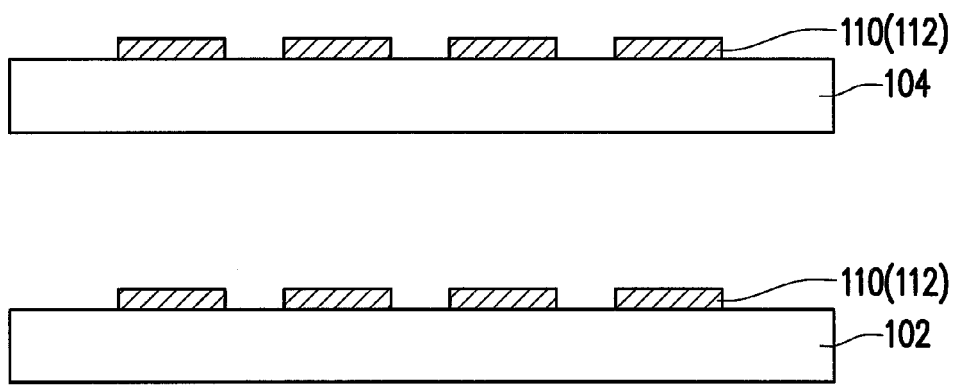
FIG. 5A to FIG. 5F are schematic views illustrating a fabrication method of a touch panel according to a third embodiment of the invention.

FIG. 5A to FIG. 5F are schematic views illustrating a fabrication method of a touch panel according to a third embodiment of the invention. With reference to FIG. 1 and FIG. 5A, in step S10, two substrates 102 and 104 on each of which a plurality of touch units 110 are formed are provided. In this embodiment, each of the touch units 110 is a resistant touch circuit layer, for instance, and each of the touch units 110 is formed by forming a plurality of first patterned circuit layers 112 on each of the substrates 102 and 104, for instance.

Figure 5B:
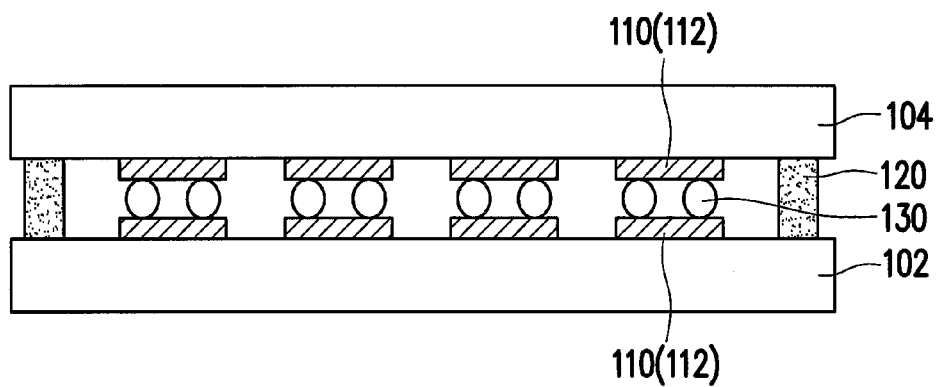

With reference to FIG. 1 and FIG. 5B, in step S20, a sealant 120 and a plurality of first spacers 130 are provided between the substrates 102 and 104, and the substrates 102 and 104 are bonded together through the sealant 120, such that the touch units 110 are sealed between the substrates 102 and 104. Here, the touch units 110 and the first spacers 130 are surrounded by the sealant 120. In this embodiment, the method of forming the first spacers 130 includes forming the first spacers 130 on each of the first patterned circuit layers 112. Namely, each of the first patterned circuit layers 112 has the first spacers 130 thereon.

Figure 5C:
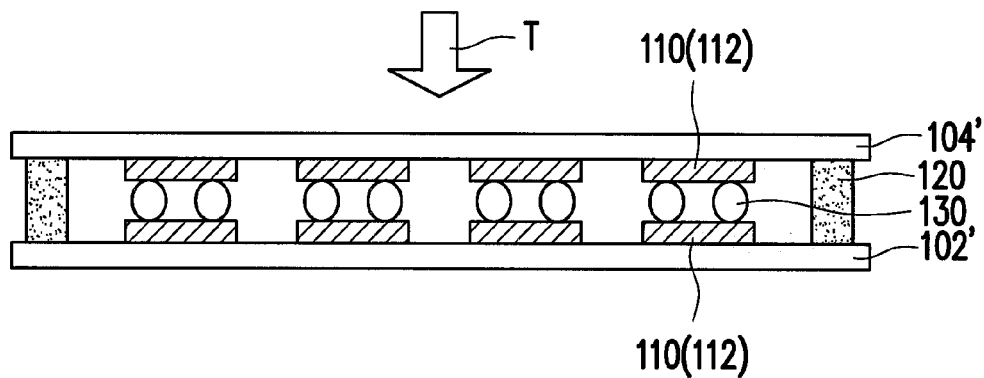

With reference to FIG. 1 and FIG. 5C, in step S30, a thinning process T is performed on the substrates 102 and 104, so as to form the thinned substrates 102' and 104'. In this embodiment, the thinning process T is well-known to people having ordinary skill in the art exemplarily pertinent to mechanical polishing, etch processing, and so on. According to an embodiment not shown in the drawings, after the substrates 102 and 104 are thinned and before the separated sub-mounts 102a and 104a (shown in FIG. 5E) are formed, at least one coating 140 can be selectively formed on the substrates 102' and 104' in this embodiment.

Figure 5D:
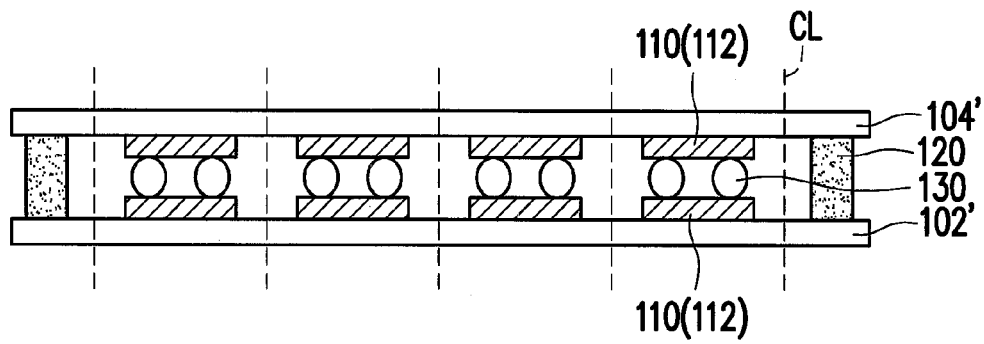
Figure 5E:
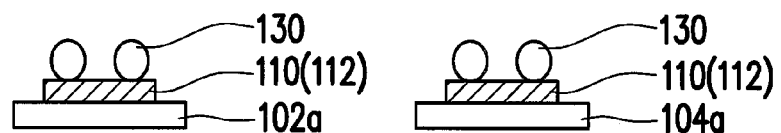

With reference to FIG. 1, FIG. 5D, and FIG. 5E, in step S40, the thinned substrates 102' and 104' are cut to form the sub-mounts 102a and 104a separated from each other. Each of the sub-mounts 102a and 104a has one of the touch units 110 thereon. According to this embodiment, as indicated in FIG. 5D, the separated sub-mounts 102a and 104a depicted in FIG. 5E are formed by performing the cutting process from the top of the substrate 102' or 104' along predetermined cutting lines CL with use of a cutter (not shown). In detail, each of the cutting lines CL corresponds to the gap among the touch units 110 and corresponds to the inner edge of the sealant 120, for instance. Thereby, after the cutting process is performed, the sub-mounts 102a and 104a are removed from the sealant 120 and separated from each other.

Figure 5F:
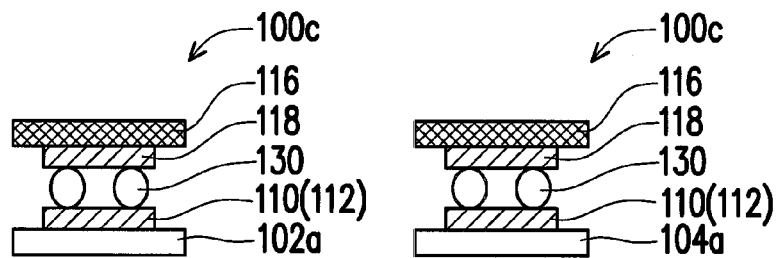

With reference to FIG. 5F, after the separated sub-mounts 102a and 104a are formed, a plurality of carriers 116 on each of which a second patterned circuit layer 118 is formed are provided. Each of the carriers 116 is bonded to the sub-mount 102a or the sub-mount 104a to cover one of the first patterned circuit layers 112. The first spacers 130 are sandwiched between the first patterned circuit layer 112 and the second patterned circuit layer 118, and thereby the touch panel 100c is formed.

As shown in FIG. 5F, in this embodiment, the touch panel 100c includes the sub-mount 102a or the sub-mount 104a, the touch unit 110, the first spacers 130, and the carrier 160. The touch unit 110 is configured on the sub-mount 102a or 104a, and the first spacers 130 are configured between the touch unit 110 and the carrier 116. Specifically, in this embodiment, the touch unit 110 includes the first patterned circuit layer 112, for instance, and the carrier 116 includes the second patterned circuit layer 118, for instance. The second patterned circuit layer 118 covers the first patterned circuit layer 112. The first spacers 130 are sandwiched between the first patterned circuit layer 112 and the second patterned circuit layer 118. Namely, in this embodiment, the first spacers 130 serve to maintain the gap between the first patterned circuit layer 112 and the second patterned circuit layer 118, so as to prevent the first patterned circuit layer 112 and the second patterned circuit layer 118 from being accidentally in contact even though the first and second patterned circuit layers 112 and 118 are not pressed.

The thinning process and the cutting process performed on the substrates as described in this embodiment are similar to those described in the first embodiment. Therefore, the fabrication methods of the touch panels described in these two embodiments have similar advantages, which will not be repeated herein. In this embodiment, note that the sub-mounts having the first patterned circuit layers are formed, and then the sub-mounts are bonded to the carriers having the second patterned circuit layers, so as to form the touch panels. The sealant is formed at the peripheries of the substrates but not formed within the substrates. Therefore, by performing the cutting process along the cutting lines that correspond to the gap between the touch units and that correspond to the inner edge of the sealant, the sub-mounts can be removed from the sealant, so as to form the sub-mounts separated from one another. By bonding the sub-mounts that have the first patterned circuit layers thereon to the carriers having the second patterned circuit layers, the second patterned circuit layers cover the first patterned circuit layers to form the touch panels. The touch panel formed by applying the fabrication method described in this embodiment is compact and reliable and can be customized without significantly increasing the manufacturing costs. What is more, the touch panel having the thinned substrates can have favorable yield rate and production rate.

In light of the foregoing, according to the fabrication method of the touch panel described in the embodiments of the invention, the two substrates are bonded, thinned, cut, and separated when the touch units are already formed on the two substrates, respectively, and then a plurality of touch panels are formed. Since the touch units are formed on the substrates which are not yet thinned, the fabrication process of the touch units can be performed when the existing production equipment is applied, and it is not necessary to replace or modify the production equipment in order to customize the substrates. As such, the manufacturing costs of the touch panel are not increased. Besides, in the fabrication process of the touch units, the substrates are less likely to be distorted or bent when the substrates are thinned. Moreover, the bonded substrates as a whole have favorable mechanical strength, and the spacers are configured between the two substrates. Hence, when the thinning process is performed on the substrates, the substrates and the touch units thereon can have satisfactory structural stability. In particular, the two thinned substrates can be separated after the last manufacturing step is completely performed or after the substrates are transported to the destination, so as to form the touch panels. As a result, the touch panels having the thinned substrates are rather unlikely to be damaged by stress during transportation. That is to say, the touch panel formed by applying the fabrication method described in the embodiments of the invention is compact and reliable and can be customized without significantly increasing the manufacturing costs. What is more, the touch panel having the thinned substrates can have favorable yield rate.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A fabrication method of a touch panel, comprising:
    providing two substrates, a plurality of touch units being formed on each of the substrates;
    providing a sealant and a plurality of first spacers between the substrates and bonding the substrates through the sealant, such that the touch units are sealed between the substrates, the touch units and the first spacers being surrounded by the sealant;
    thinning the substrates;
    cutting the thinned substrates into a plurality of sub-mounts, the sub-mounts being separated from one another, each of the sub-mounts having one of the touch units thereon; and
    removing the first spacers after the sub-mounts separated from one another are formed.

2. The fabrication method of the touch panel as claimed in claim 1, wherein each of the touch units is a capacitive touch circuit layer.

3. The fabrication method of the touch panel as claimed in claim 1, wherein a method of forming the first spacers comprises:
    forming the first spacers on one of the substrates by photolithography.

4. The fabrication method of the touch panel as claimed in claim 1, wherein each of the touch units is a resistant touch circuit layer.

5. The fabrication method of the touch panel as claimed in claim 4, wherein a method of forming each of the resistant touch circuit layers comprises:
    forming a plurality of first patterned circuit layers on each of the substrates;
    foaming a plurality of second spacers on each of the first patterned circuit layers;
    providing a plurality of carriers, a second patterned circuit layer being formed on each of the carriers; and
    bonding each of the carriers to one of the substrates to cover one of the first patterned circuit layers, the second spacers being sandwiched between the first patterned circuit layers and the second patterned circuit layers.

6. The fabrication method of the touch panel as claimed in claim 4, wherein a method of forming each of the resistant touch circuit layers comprises:
    forming a plurality of first patterned circuit layers on each of the substrates; and
    forming the first spacers on each of the first patterned circuit layers.

7. The fabrication method of the touch panel as claimed in claim 6, further comprising:
    providing a plurality of carriers after forming the sub-mounts separated from one another, a second patterned circuit layer being formed on each of the carriers; and
    bonding each of the carriers to one of the sub-mounts to cover one of the first patterned circuit layers, the first spacers being sandwiched between the first patterned circuit layers and the second patterned circuit layers.

8. The fabrication method of the touch panel as claimed in claim 1, further comprising forming at least one coating on the substrates after thinning the substrates and before forming the sub-mounts separated from one another.

9. The fabrication method of the touch panel as claimed in claim 8, wherein the coating comprises an electromagnetic-wave shielding layer, a passivation layer, or a layer in which the electromagnetic-wave shielding layer and the passivation layer are stacked.

* * * * *